(12) United States Patent
Bezalel

(10) Patent No.: US 11,221,784 B2
(45) Date of Patent: Jan. 11, 2022

(54) METHOD AND SYSTEM FOR USER DATA BACKUP WITHIN A VIRTUAL DESKTOP ENVIRONMENT

(71) Applicant: HiveIO Inc., Hoboken, NJ (US)

(72) Inventor: Ofer Bezalel, Hoboken, NJ (US)

(73) Assignee: HiveIO Inc., Hoboken, NJ (US)

( * ) Notice: Subject to any disclaimer, the term of this patent is extended or adjusted under 35 U.S.C. 154(b) by 0 days.

(21) Appl. No.: 16/672,412

(22) Filed: Nov. 1, 2019

(65) Prior Publication Data

US 2021/0132810 A1 May 6, 2021

(51) Int. Cl.
*G06F 9/455* (2018.01)
*G06F 3/06* (2006.01)
*G06F 16/23* (2019.01)

(52) U.S. Cl.
CPC .............. *G06F 3/065* (2013.01); *G06F 3/067* (2013.01); *G06F 3/0619* (2013.01); *G06F 3/0664* (2013.01); *G06F 9/45558* (2013.01); *G06F 16/2379* (2019.01); *G06F 2009/45583* (2013.01)

(58) Field of Classification Search
CPC ............................................. G06F 2009/45575
See application file for complete search history.

(56) References Cited

U.S. PATENT DOCUMENTS 8,141,090 B1* 3/2012 Graupner ............ G06F 9/45558
718/104
2018/0341511 A1* 11/2018 Halperin ............. G06F 9/45537

* cited by examiner

*Primary Examiner* — Edward J Dudek, Jr.
(74) *Attorney, Agent, or Firm* — Hodgson Russ LLP

(57) ABSTRACT

A method for providing virtual desktop services includes receiving a request for a session from a user; instantiating a virtual machine for the session; copying user data for the user from a data backup to a user volume attached to the virtual machine; and creating a delta disk associated with the user volume, wherein the delta disk records changes to the user data during the session. A system for providing virtual desktop services, includes a shared storage device having user data stored thereon; a host server configured to run one or more virtual machines, the host server having a local storage device; virtual machine having a user volume with a copy of the user data and a delta disk having changed user data.

7 Claims, 7 Drawing Sheets

METHOD AND SYSTEM FOR USER DATA BACKUP WITHIN A VIRTUAL DESKTOP ENVIRONMENT

FIELD OF THE DISCLOSURE

The present disclosure relates to virtual machines, and in particular, virtual desktop services.

BACKGROUND OF THE DISCLOSURE

When using a desktop computer, users are able to store their personal data and customize their computer environment. Such personal data and user customization (i.e., user profiles) are referred to herein as "user data." In moving users from using desktop computers to accessing virtual desktop services, it is often desirable to provide a similar ability to store such user data. However, given the distributed nature of a typical data center, a user's access to such user data can be impeded. For example, a user may access a virtual machine across a network connection, and that virtual machine may access the user's data from a network-attached storage device across another network connection. When compared to using desktop computer with local storage, a reduction in performance of a virtual desktop due to network latency and/or bandwidth can be detrimental.

BRIEF SUMMARY OF THE DISCLOSURE

A method for providing virtual desktop services, includes receiving a request for a session from a user; instantiating a virtual machine for the session; copying user data for the user from a data backup to a user volume attached to the virtual machine; and creating a delta disk associated with the user volume, wherein the delta disk records changes to the user data during the session. The method may further include receiving a backup trigger; establishing a volume shadow of the user volume to create a temporary delta disk; removing the volume shadow such that the user volume is associated with the temporary delta disk and further changes to the user data are recorded to the temporary delta disk; copying the delta disk to a delta disk copy; block committing the user data from the delta disk copy to the user data of the data backup and the user data of the user volume; deleting the delta disk and the delta disk copy; recreating the delta disk; and block committing the user data from the temporary delta disk to the recreated delta disk. The backup trigger may be, for example, a scheduled event, a user logoff action, or a user disconnect action. The method may further include receiving a backup trigger for a user logoff or disconnect event; copying the delta disk to a delta disk copy; block committing the user data from the delta disk copy to the user data of the data backup; and deleting the delta disk, the delta disk copy, the user volume, and the virtual machine.

A system for providing virtual desktop services, includes a shared storage device having user data stored thereon; a host server configured to run one or more virtual machines, the host server having a local storage device; virtual machine having a user volume with a copy of the user data and a delta disk having changed user data. The host server is configured to receive a request for a session from a user; instantiate a virtual machine for the session, the virtual machine having a user volume configured on the local storage device; copy user data for the user from the shared storage device to the user volume; and create, on the local storage device, a delta disk associated with the user volume, wherein the delta disk records changes to the user data during the session.

The host server may be further configured to receive a backup trigger; establish a volume shadow of the user volume on the local storage device, to create a temporary delta disk; remove the volume shadow such that the user volume is associated with the temporary delta disk and further changes to the user data are recorded to the temporary delta disk; copy the delta disk to a delta disk copy; block commit the user data from the delta disk copy to the user data of the shared storage device and the user data of the user volume; delete the delta disk and the delta disk copy; recreate the delta disk; and block commit the user data from the temporary delta disk to the recreated delta disk. The host computer may be further configured to receive a backup trigger for a user logoff or disconnect event; copy the delta disk to a delta disk copy; block commit the user data from the delta disk copy to the user data of the shared storage device; and delete the delta disk, the delta disk copy, the user volume, and the virtual machine.

In another aspect, the present disclosure may be embodied as a non-transitory computer-readable medium having instructions thereon to cause a computer to perform any of the methods disclosed herein.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

In a typical environment for virtual desktop services, user data is stored on a shared storage system such as, for example, a storage area network (SAN) or a network-attached storage (NAS) device. Virtual desktop services are provided to one or more users from a host server, where virtual machines, such as, for example, persistent or non-persistent (stateless) desktops, are managed by a hypervisor.

Figure 7:
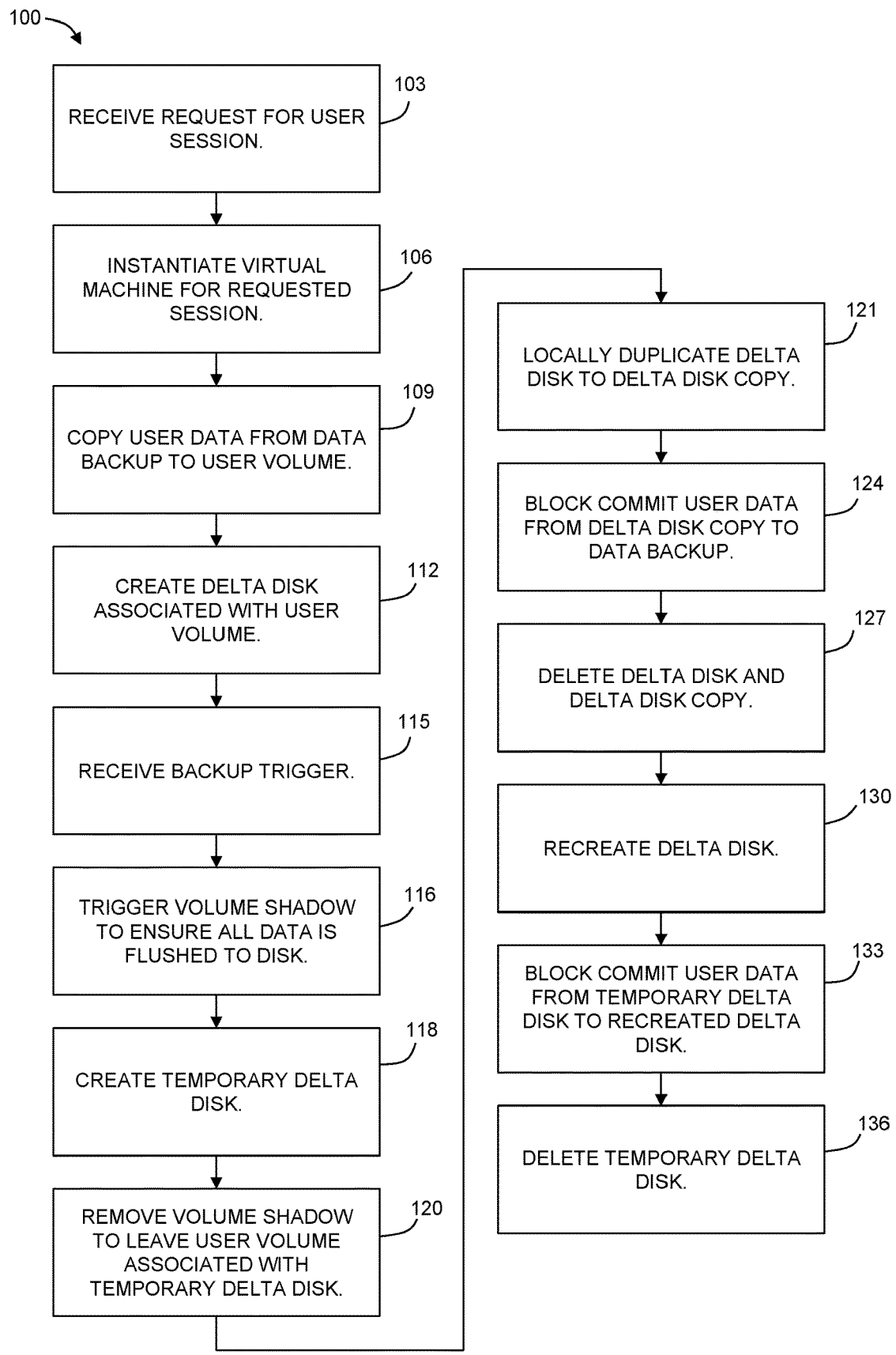
FIG. 7 depicts a method according to another embodiment of the present disclosure.
Figure 8:
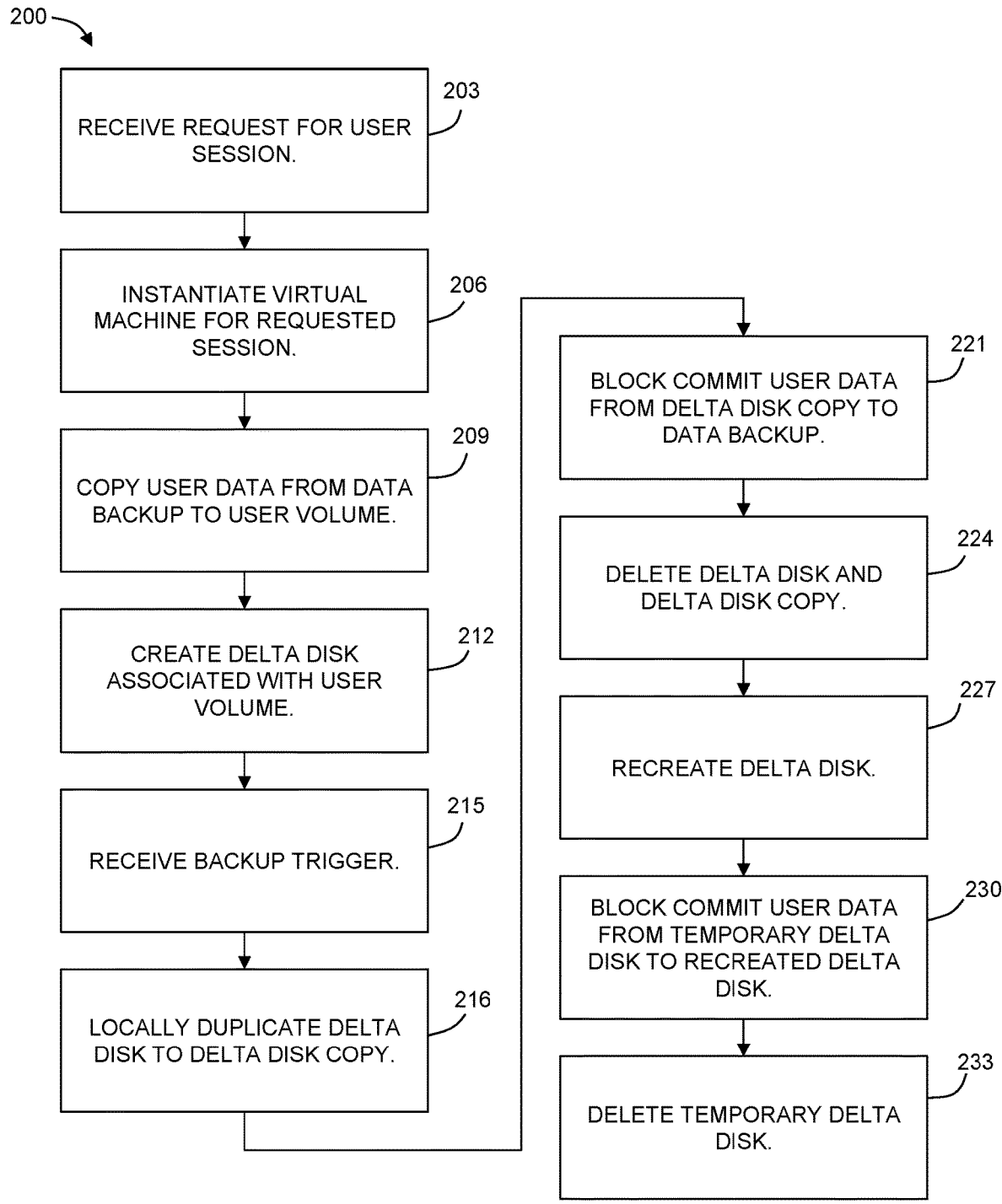
FIG. 8 depicts a method according to another embodiment of the present disclosure.

With reference to FIG. 7, in a first aspect, the present disclosure may be embodied as a method 100 for providing virtual desktop services. A request for a session is received 103 from a user. The host server instantiates a virtual machine 106 for the requested session. The user data for the user is copied 109 from a data backup (e.g., a shared storage device/system) to a user volume attached to the virtual machine. The user volume may be local to the host server such as, for example, on a solid state disk (SSD) or within the random-access memory (RAM) of the host server. In this way, the access to user data from the virtual machine can take advantage of extremely fast storage.

A delta disk is created 112 for the user volume. The delta disk is configured to record any user data changes during the current session. As such, if the user updates a user profile setting, the user data associated with this setting would be written to the delta disk associated with the user volume.

Figure 1:
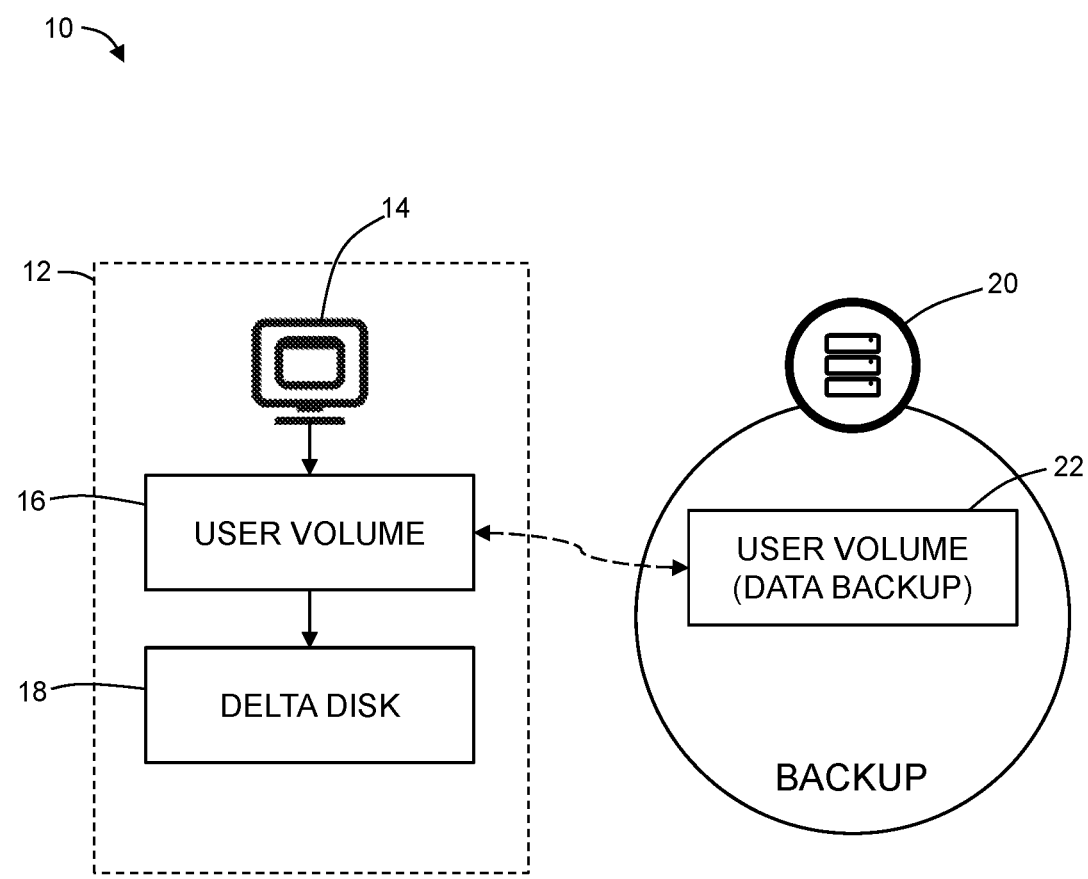
FIG. 1 depicts a system for providing virtual desktop services according to an embodiment of the present disclosure.
Figure 2A:
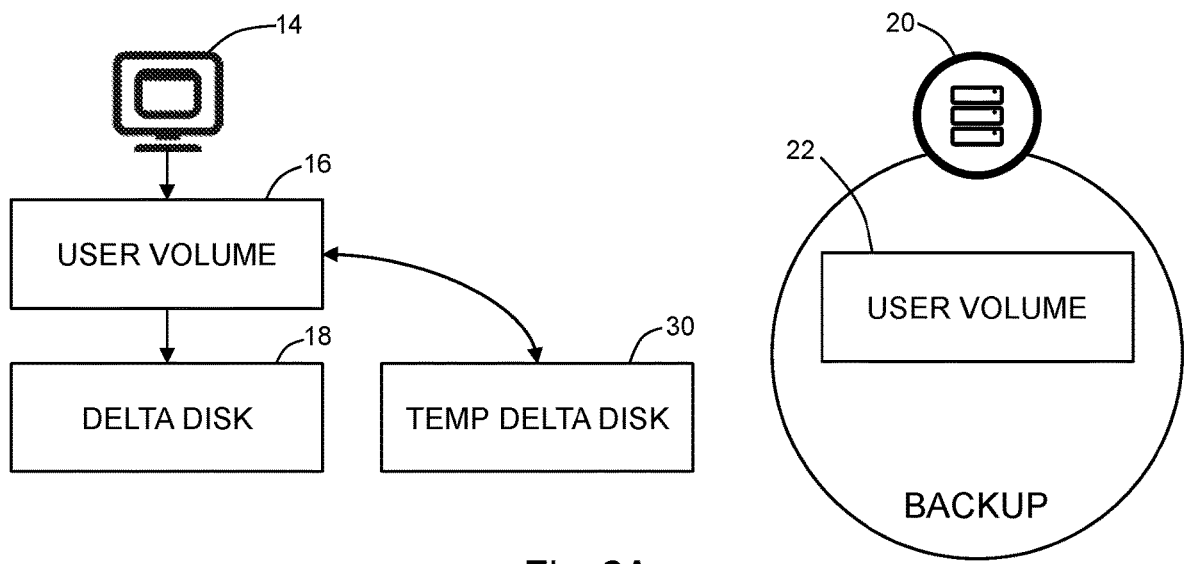
FIG. 2A depicts the system of FIG. 1, wherein a temporary delta disk has been created.
Figure 2B:
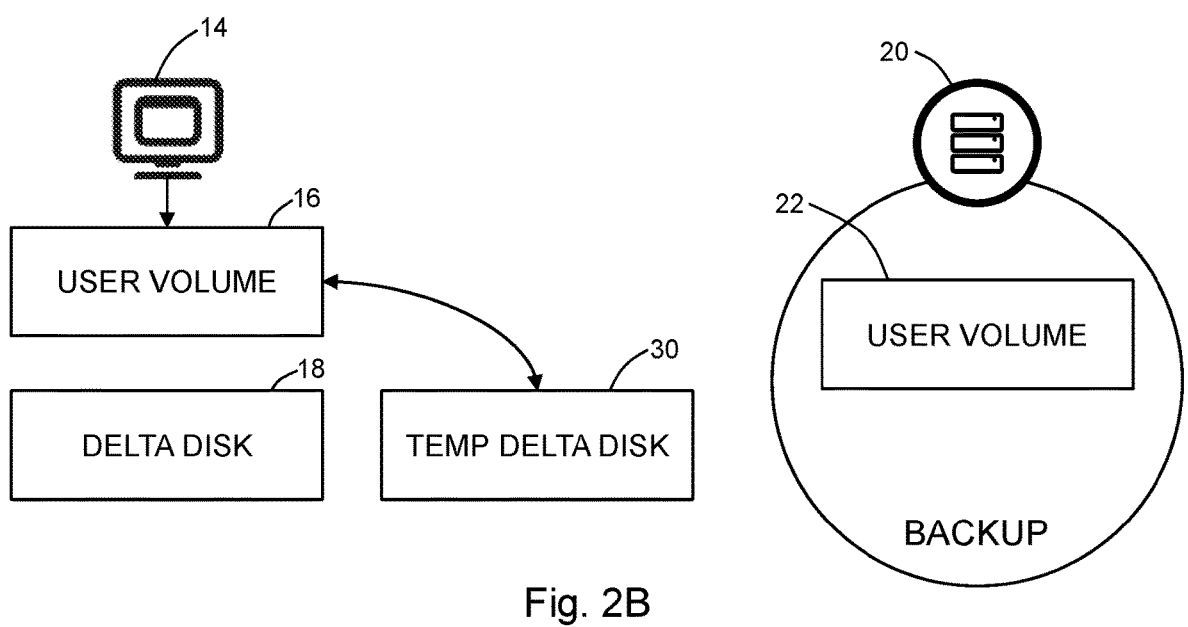
FIG. 2B depicts the system of FIG. 2A, wherein a volume shadow to a delta disk is removed.

During the user session, a backup may be triggered by various events. For example, a backup may be triggered according to a schedule of periodic backups. In another example, a backup may be triggered by a logoff or disconnect action by the user. The method 100 includes receiving 115 a backup trigger. In some embodiments, such as when the received 115 backup trigger is based on a scheduled, an operating system-level volume shadow is triggered 116 to ensure that all data is flushed to the disk, and a temporary delta disk is created 118 using the volume shadow (FIG. 2A). For example, a volume shadow of the delta disk is triggered 116 and a snapshot of the delta disk is taken (as the temporary delta disk). The volume shadow is then removed 120 leaving the user volume associated with the temporary delta disk (FIG. 2B). By flushing all data to disk using the volume shadow, changes are prevented while the temporary delta disk is created 118.

Figure 3:
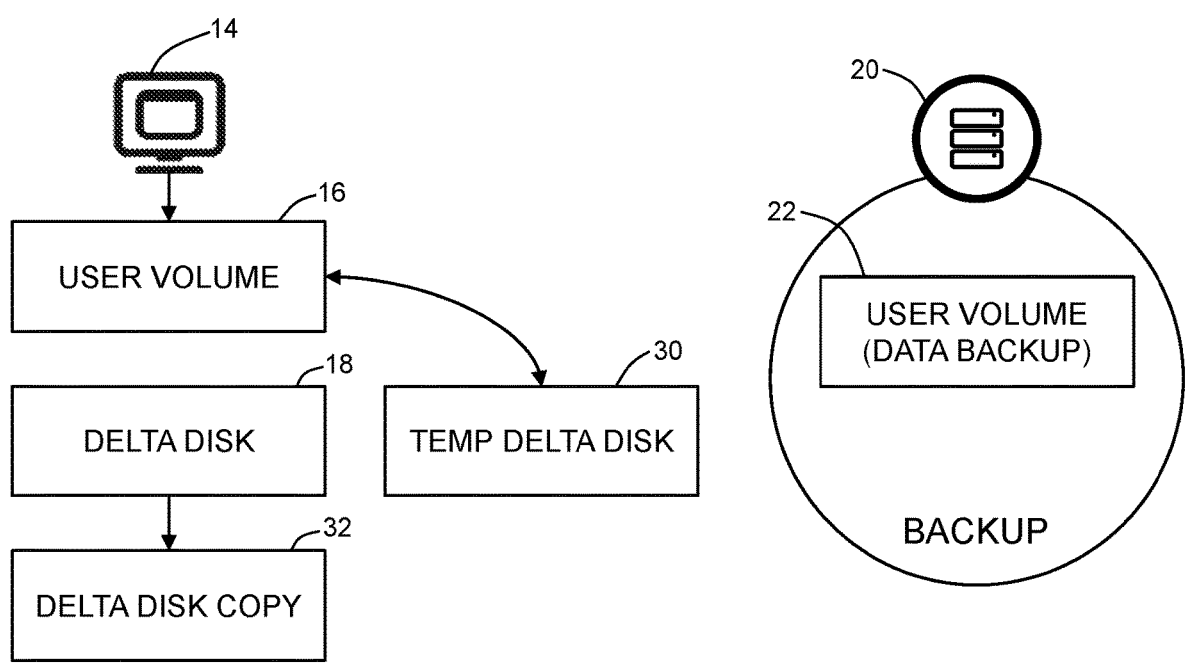
FIG. 3 depicts the system of FIG. 2B, wherein the delta disk is copied to a delta disk copy.
Figure 4A:
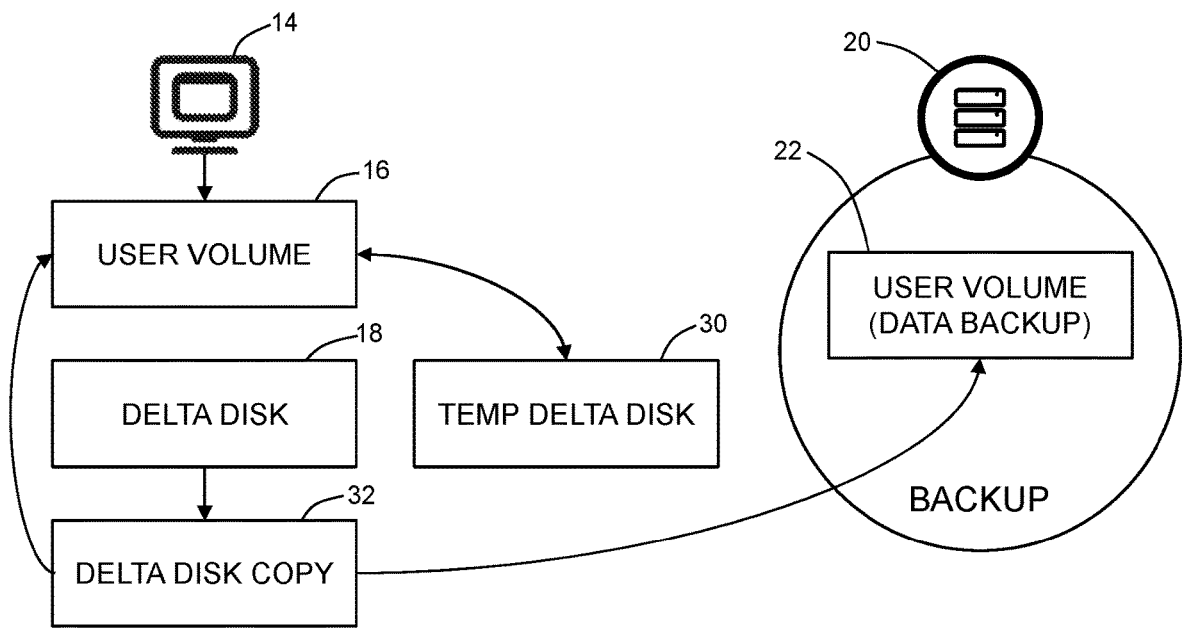
FIG. 4A depicts the system of FIG. 3, wherein the delta disk copy is block committed to a data backup and a user volume.
Figure 4B:
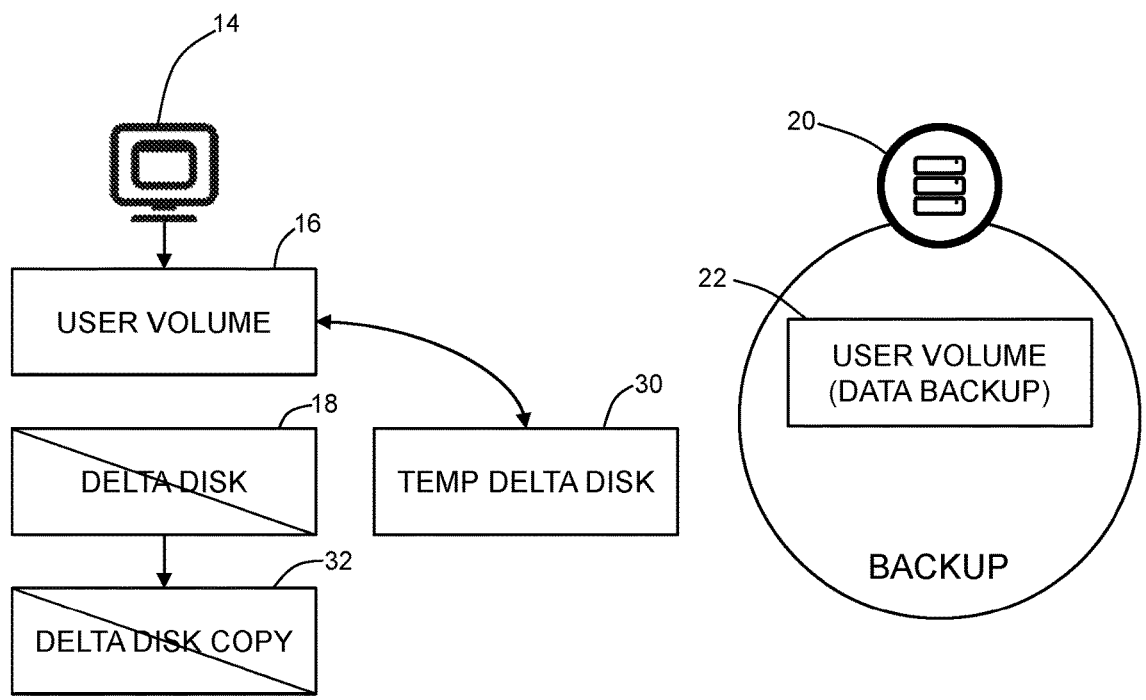
FIG. 4B depicts the system of FIG. 4A, wherein the delta disk and the delta disk copy are deleted.
Figure 5:
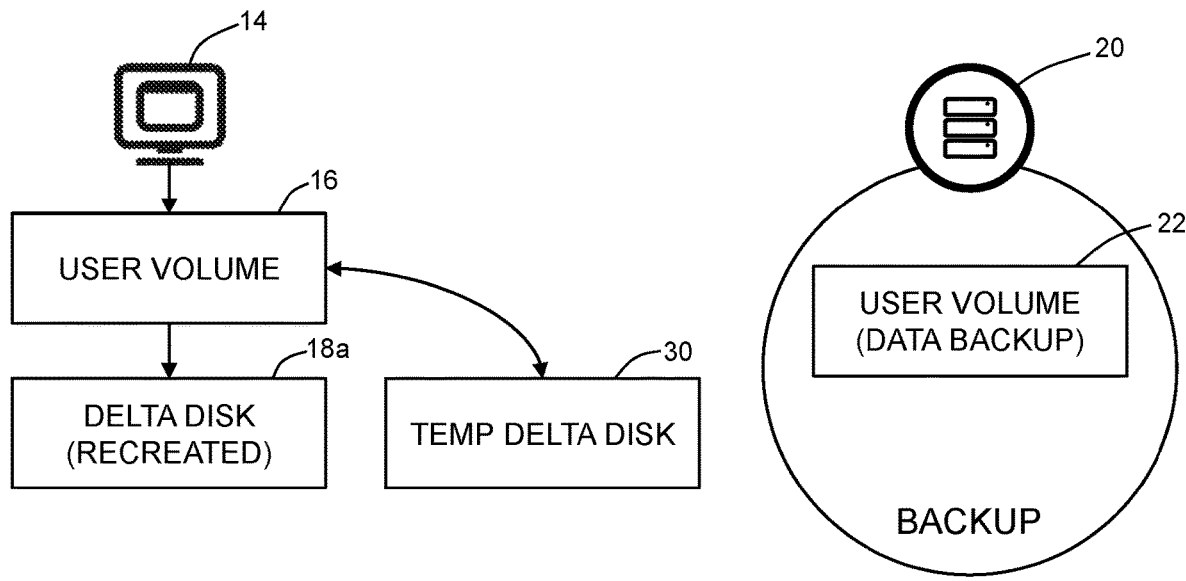
FIG. 5 depicts the system of FIG. 4B, wherein the delta disk is recreated.
Figure 6:
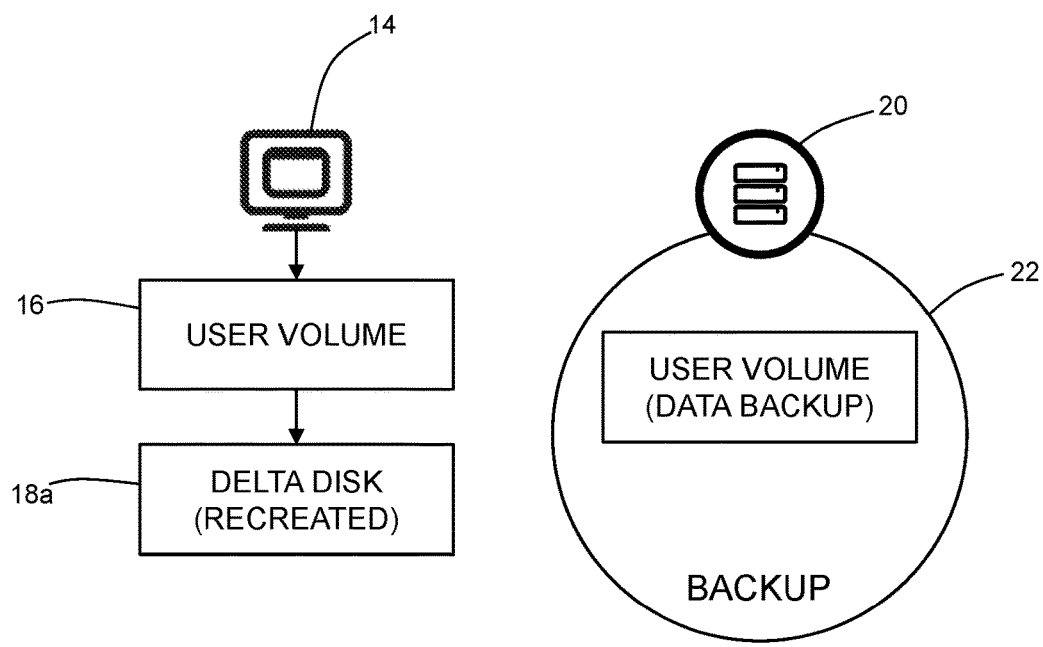
FIG. 6 depicts the system of FIG. 5, wherein the temporary delta disk is deleted/removed.

The delta disk is locally duplicated 121 to a delta disk copy (FIG. 3). The user data from the delta disk copy is block committed 124 to the user data of the data backup (FIG. 4A). During the block commit, the delta disk and the delta disk copy are zeroed out and then deleted 127 upon completion (FIG. 4B). In other words, as blocks are committed, the corresponding space within the delta disk and the delta disk copy are marked as free. It is known that marking such space as free generally does not reduced the size of the delta disk or the delta disk copy. As such, these are deleted and the delta disk is recreated 130 in order to minimize its size (FIG. 5). Finally, the user data from the temporary delta disk is block committed 133 to the (recreated) delta disk. In this way, any user data updated during the above-described backup process can be reestablished on the minimally-sized delta disk. The temporary delta disk may then be deleted 136 (FIG. 6).

In another aspect, the present disclosure may be embodied as a system 10 for providing virtual desktop services. The system 10 includes a host server 12 configured to run virtual machines 14. For example, the host server 12 may include a processor, random-access memory ("RAM"), and local storage, such as hard disks or solid-state drives ("SSDs"). The host server 12 may have a hypervisor running thereon. The hypervisor is configured to manage (e.g., create, run, etc.) one or more instances of virtual machine(s)—each of which is capable of running an operating system and compute environment.

The system 10 also includes a shared storage device 20, such as, for example, a storage-area network ("SAN"), network-attached storage ("NAS"), or otherwise. Such a shared storage device 20 may be accessed by the host server 12, other host servers, and/or other devices within a data room and/or remote to the data room. The shared storage device 20 is configured for long-term (e.g., non-volatile) storage of data. For example, in a virtual desktop infrastructure ("VDI"), user data may be stored on a shared storage device 20 (called "data backup" within this disclosure—e.g., data backup 22).

In an embodiment of the present system 10, the host server 12 has a virtual machine 14 running thereon. The virtual machine 14 may be configured, for example, for VDI use as a virtual desktop session for a particular user. Such a virtual machine 14 has a user volume 16, local to the host server 12. For example, the user volume 16 may be configured within the RAM or local storage of the host server 12. The user volume 16 may include a copy of the user data copied from the data backup 22 of the shared storage device 20. The host server 12 may also be configured with a delta disk 18 associated with the user volume 16. The delta disk 18 is used to store changes made to the user data during the session.

During a user's session, a backup event may be triggered so as to copy the user's data to the data backup 22 of the shared storage device 20 (as described above). For example, the backup may be triggered according to a schedule, due to user logoff, manually triggered, or for any other reason(s). As such, the host server 12 may be programmed to perform any of the methods described herein. In a particular example, the host server 12 may be programmed to trigger a volume shadow, create a temporary delta disk 30, and remove the volume shadow (leaving the user volume 16 associated with the temporary delta disk 30). The delta disk 18 may then be duplicated to a delta disk copy 32. The user data may be block committed form the delta disk copy 32 to the data backup 22 of the shared storage device 20. At this point, the host server 12 may delete the delta disk 18 and the delta disk copy 32. A delta disk 18a may then be (re)created so as to be minimally sized. Data from the temporary delta disk 30 may then be block committed to the recreated delta disk 18a and the temporary delta disk 30 is deleted.

In another aspect, the present disclosure may be embodied as a non-transitory computer-readable medium having instructions thereon to cause a computer to perform any of the methods disclosed herein.

Some instances described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other instances described herein relate to a computer program product, which can include, for example, the instructions and/or computer code discussed herein.

Examples of computer code include, but are not limited to, micro-code or microinstructions, machine instructions, such as produced by a compiler, and files containing higher-level instructions that are executed by a computer using an interpreter. Additional examples of computer code include, but are not limited to, control signals, encrypted code, and compressed code.

Although the present disclosure has been described with respect to one or more particular embodiments, it will be understood that other embodiments of the present disclosure may be made without departing from the spirit and scope of the present disclosure.

What is claimed is:

1. A method for providing virtual desktop services, comprising:
   receiving a request for a session from a user;
   instantiating a virtual machine for the session;
   copying user data for the user from a data backup to a user volume attached to the virtual machine;
   creating a delta disk associated with the user volume, wherein the delta disk records changes to the user data during the session;
   receiving a backup trigger;
   establishing a volume shadow of the user volume to create a temporary delta disk;
   removing the volume shadow such that the user volume is associated with the temporary delta disk and further changes to the user data are recorded to the temporary delta disk;
   copying the delta disk to a delta disk copy;
   block committing the user data from the delta disk copy to the user data of the data backup and the user data of the user volume;
   deleting the delta disk and the delta disk copy;
   recreating the delta disk; and
   block committing the user data from the temporary delta disk to the recreated delta disk.

2. The method of claim 1, wherein the backup trigger is a scheduled event, a user logoff action, or a user disconnect action.

3. The method of claim 1, further comprising:
   receiving a backup trigger for a user logoff or disconnect event;
   copying the delta disk to a delta disk copy;
   block committing the user data from the delta disk copy to the user data of the data backup; and
   deleting the delta disk, the delta disk copy, the user volume, and the virtual machine.

4. A system for providing virtual desktop services, comprising:
   a shared storage device having user data stored thereon;
   a host server configured to run one or more virtual machines, the host server having a local storage device;
   virtual machine having a user volume with a copy of the user data and a delta disk having changed user data;
   wherein the host server is configured to:
      receive a request for a session from a user;
      instantiate a virtual machine for the session, the virtual machine having a user volume configured on the local storage device;
      copy user data for the user from the shared storage device to the user volume;
      create, on the local storage device, a delta disk associated with the user volume, wherein the delta disk records changes to the user data during the session;
      receive a backup trigger;
      establish a volume shadow of the user volume on the local storage device, to create a temporary delta disk;
      remove the volume shadow such that the user volume is associated with the temporary delta disk and further changes to the user data are recorded to the temporary delta disk;
      copy the delta disk to a delta disk copy;
      block commit the user data from the delta disk copy to the user data of the shared storage device and the user data of the user volume;
      delete the delta disk and the delta disk copy;
      recreate the delta disk; and
      block commit the user data from the temporary delta disk to the recreated delta disk.

5. The system of claim 4, wherein the host server is further configured to:
   receive a backup trigger for a user logoff or disconnect event;
   copy the delta disk to a delta disk copy;
   block commit the user data from the delta disk copy to the user data of the shared storage device; and
   delete the delta disk, the delta disk copy, the user volume, and the virtual machine.

6. A non-transitory computer-readable medium having instructions thereon to cause a computer to:
   receive a request for a session from a user;
   instantiate a virtual machine for the session;
   copy user data for the user from a data backup to a user volume attached to the virtual machine;
   create a delta disk associated with the user volume, wherein the delta disk records changes to the user data during the session;
   receive a backup trigger;
   establish a volume shadow of the user volume to create a temporary delta disk;
   remove the volume shadow such that the user volume is associated with the temporary delta disk and further changes to the user data are recorded to the temporary delta disk;
   copy the delta disk to a delta disk copy;
   block commit the user data from the delta disk copy to the user data of the data backup and the user data of the user volume;
   delete the delta disk and the delta disk copy;
   recreate the delta disk; and
   block commit the user data from the temporary delta disk to the recreated delta disk.

7. The non-transitory computer-readable medium of claim 6, having further instructions to:
   receive a backup trigger for a user logoff or disconnect event;
   copy the delta disk to a delta disk copy;
   block commit the user data from the delta disk copy to the user data of the data backup; and
   delete the delta disk, the delta disk copy, the user volume, and the virtual machine.

* * * * *